United States Patent [19]
Morita

[11] Patent Number: 5,128,499
[45] Date of Patent: Jul. 7, 1992

[54] WIRELESS COORDINATE READING SYSTEM

[75] Inventor: Yoshiyuki Morita, Tokyo, Japan

[73] Assignee: Seiko Instruments, Inc., Tokyo, Japan

[21] Appl. No.: 700,235

[22] Filed: May 15, 1991

[30] Foreign Application Priority Data

May 15, 1990 [JP] Japan ................................ 2-125052

[51] Int. Cl.$^5$ ............................................. G08C 21/00
[52] U.S. Cl. .................................................... 178/19
[58] Field of Search ............................ 178/19, 18, 87; 340/709

[56] References Cited

U.S. PATENT DOCUMENTS

| 4,205,199 | 5/1980 | Mochizuki | 178/19 |
| 4,848,496 | 7/1989 | Murakami et al. | 178/19 |
| 4,890,096 | 12/1989 | Taguchi et al. | 178/19 X |

FOREIGN PATENT DOCUMENTS

| 52-96825 | 8/1977 | Japan . |
| 55-96411 | 7/1980 | Japan . |

Primary Examiner—Stafford D. Schreyer
Attorney, Agent, or Firm—Spensley Horn Jubas & Lubitz

[57] ABSTRACT

A wireless coordinate reading system composed of: a plurality of sense lines disposed in parallel with one another and equispaced from one another in a coordinate detecting direction; first and second excitation lines each composed of a plurality of conductors connected together in series and arranged in a zigzag pattern, the conductors being disposed in parallel with one another and equispaced from one another and extending in a direction to intersect the sense lines at right angles thereto; an excitation signal generating circuit for producing an AC signal; an excitation selecting circuit connected for connecting a selected one or the excitation lines to the excitation signal generating circuit; a scanning circuit connected for selecting successive ones of the sense lines in sequence; a wireless coordinate indicator containing components forming a resonator constructed to resonate with the AC signal generated by the excitation signal generating circuit, the indicator being positionable relative to the sense lines in order for the resonator to be electromagnetically coupled with the sense lines; and a signal processing and control circuit connected to evaluate signals induced in each sense line as the selecting and scanning circuits are operated to select successive sense lines.

5 Claims, 9 Drawing Sheets

FIG. 4(a)
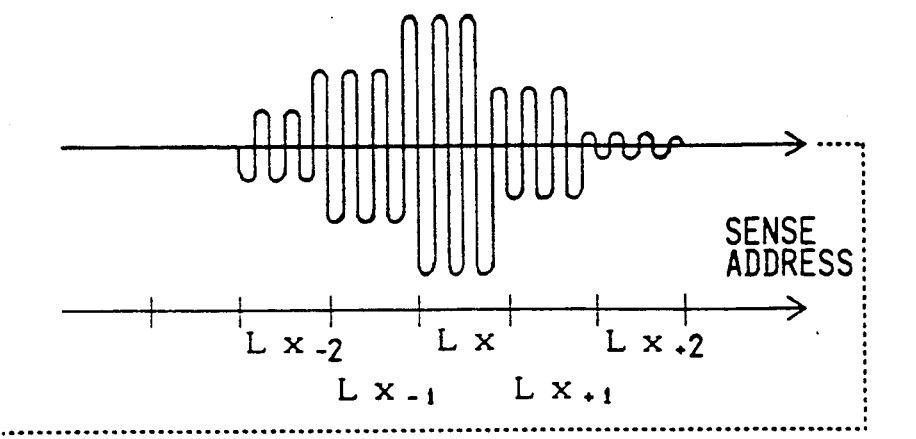
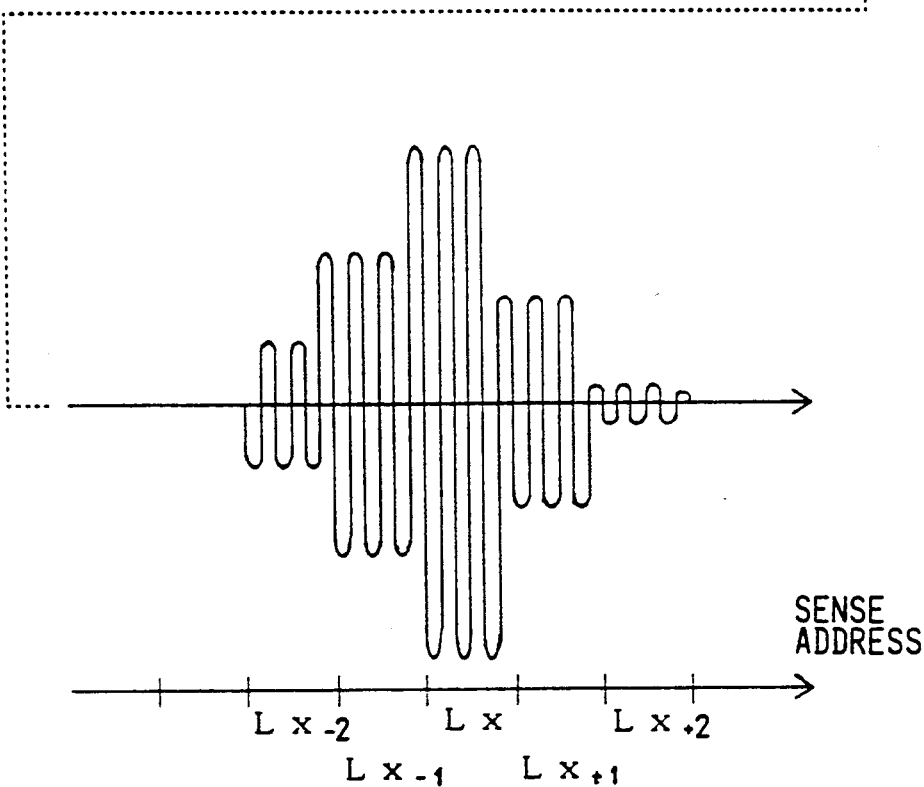
FIG. 4(b)

FIG. 6(a) I
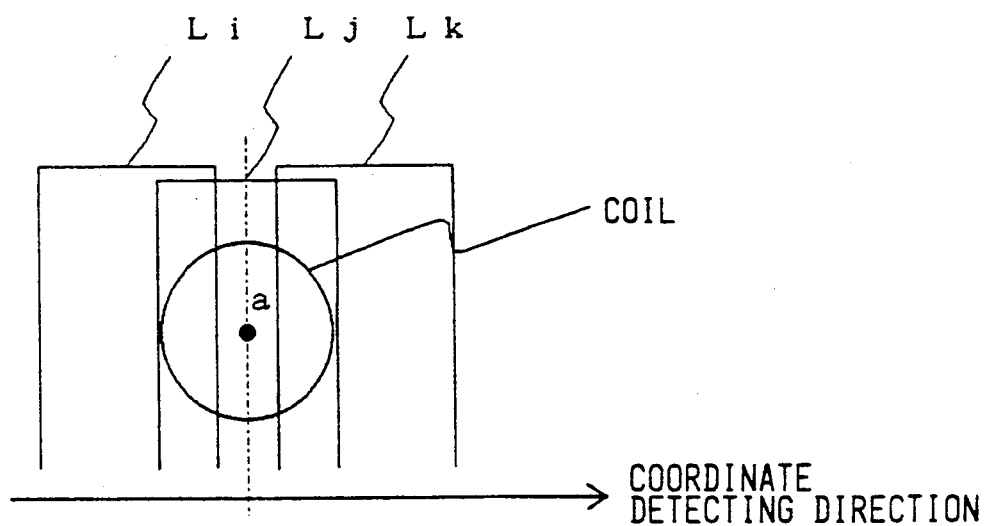
FIG. 6(a) II
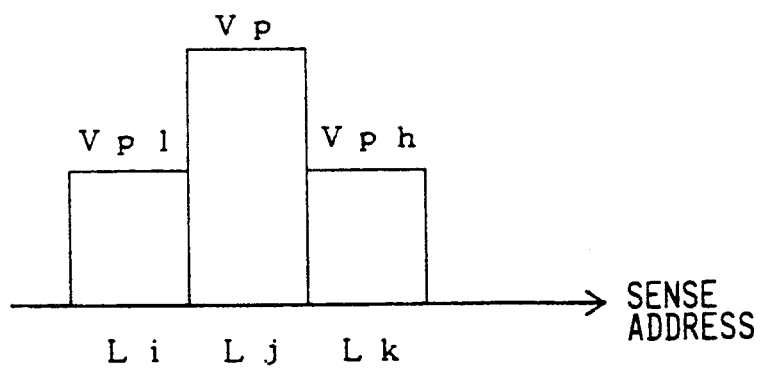

FIG. 6(b) I
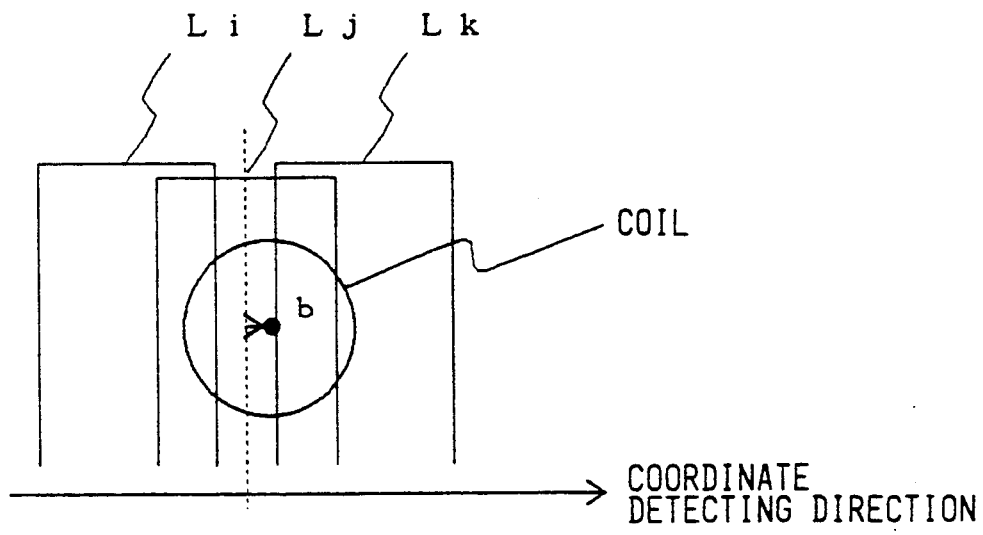
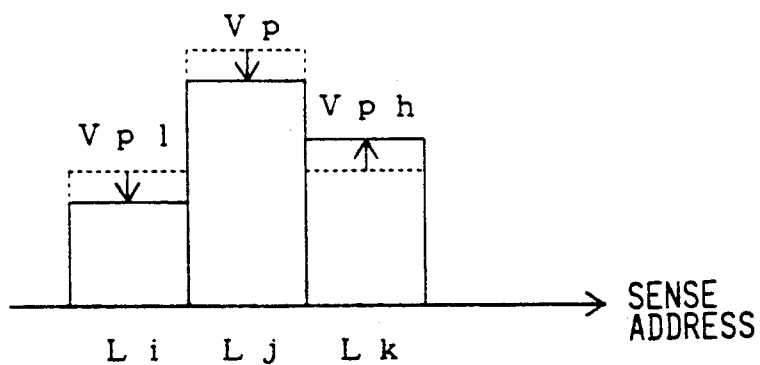
FIG. 6(b) II

FIG. 6(c) I
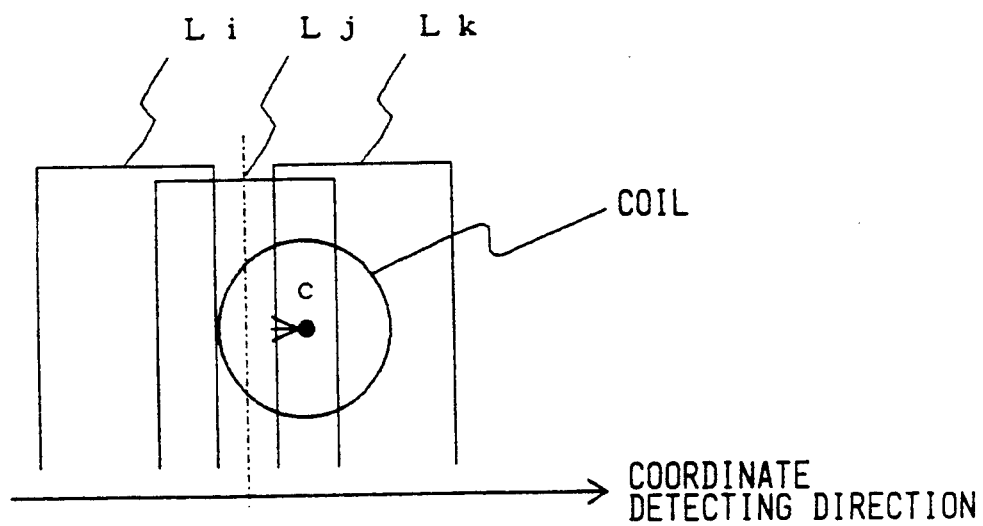
FIG. 6(c) II
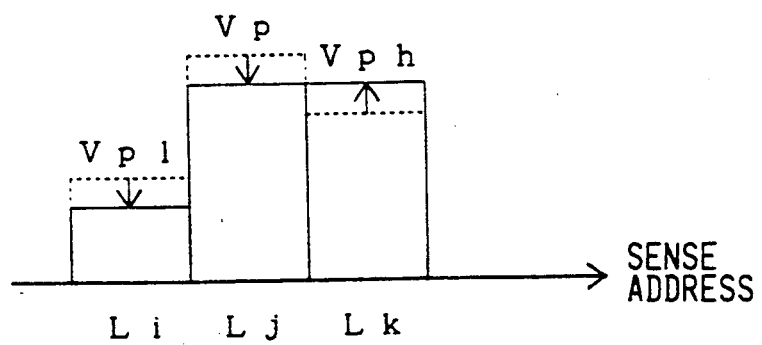

5,128,499

WIRELESS COORDINATE READING SYSTEM

BACKGROUND OF THE INVENTION

The present invention relates to a coordinate reading system for inputting coordinates to an external device such as a computer and, more particularly, to an electromagnetic induction type coordinate system which makes use of electromagnetic induction phenomena.

Coordinate reading systems of the type already known in the prior art are exemplified by commonly-owned Japanese Laid-Open Patent application Nos. 96825/1977 and 96411/1980.

An exemplary coordinate reading system according to the prior art will be briefly described in the following.

FIG. 8 is a diagram showing the structure of the exemplary coordinate reading system of the prior art. In a tablet acting as a coordinate reading plate, there are laid a plurality of sense line groups 101 which have loop shapes. The tablet itself is not explicitly shown in FIG. 8. The sense line groups are selected one by one by a scanning circuit 102. This scanning circuit 102 has its output connected to a signal processing circuit 105, the output of which in turn is connected to a control circuit 106. This control circuit 106 feeds a scanning signal s101 to cause the aforementioned scanning circuit 102 to scan groups 101 sequentially.

The system further includes a coordinate indicator 107 having a coil 107a packaged therein and connected through an excitation signal line 108 to an excitation signal generating circuit 104 which is packaged in the tablet.

With the structure as thus described, coordinate values indicated by indicator 107 are calculated in the following manner. The coordinate indicator 107 is placed on the sense line groups 101 and generates an AC magnetic field at all times in response to the signal from the excitation signal generating circuit 104. The control circuit 106 feeds the scanning signal s101 to close the switches of scanning circuit 102 sequentially. The current induced in each sense line group 101 is dependent upon the position of coordinate indicator 107, and an induction signal s102 for each sense line is sequentially inputted to signal processing circuit 105 by selecting the sense line groups 101 with the scanning circuit 102.

The signal processing circuit 105 generates an envelope waveform of those induction signals. The control circuit 106 determines the coordinate values of the position of indicator 107 by inputting the amplitudes of the induction signals for the individual sense lines from the envelope waveform and by comparing the amplitudes arithmetically.

In this prior art coordinate reading system, however, an AC signal has to be fed to coordinate indicator 107 so as to generate a magnetic field which emanates from the coordinate indicator. For this purpose, the tablet and the coordinate indicator have to be connected through a signal line.

SUMMARY OF THE INVENTION

It is an object of the present invention to provide a wireless coordinate reading system which need not have its coordinate indicator and tablet connected through a signal line.

The above and other objects are achieved, according to the present invention, by the provision of a wireless coordinate reading system comprising:
a plurality of sense lines disposed in parallel with one another and equispaced from one another in a coordinate detecting direction;
a first excitation line composed of a plurality of conductors connected together in series and arranged in a zigzag pattern, the conductors being disposed in parallel with one another and equispaced from one another and extending in a direction to intersect the sense lines at right angles to the sense lines;
a second excitation line composed of a plurality of conductors connected together in series and arranged in a zigzag pattern, the conductors being disposed in parallel with one another and equispaced from one another and extending in a direction to intersect the sense lines at right angles to the sense lines, with each conductor of the second excitation line being positioned between two adjacent conductors of the first excitation line;
an excitation signal generating circuit for producing an AC signal;
an excitation selecting circuit connected for selecting one of the first excitation line and the second excitation line to connect the selected excitation line to the excitation signal generating circuit;
a scanning circuit connected for selecting one of the sense lines;
a coordinate indicator containing means including a coil and forming a resonator constructed to resonate with the AC signal generated by the excitation signal generating circuit, the indicator being positionable relative to the sense lines and the excitation lines in order for the resonator to electromagnetically couple the first and second excitation lines and the sense lines;
a signal processing circuit connected to the scanning circuit for processing signals induced in the sense lines by electromagnetic coupling with the coil contained in the coordinate indicator; and
a control circuit connected to the excitation selecting circuit, the scanning circuit and the signal processing circuit for determining a coordinate of the position of the coordinate indicator by controlling the excitation selecting circuit and the scanning circuit such that one of the first excitation line and the second excitation line is selected by the excitation selecting circuit and the sense lines are sequentially selected by the scanning circuit, and by receiving, from the signal processing circuit, induced signals which are induced on the individual sense lines selected by the scanning circuit and processing the amplitudes of the induced signals arithmetically.

In this system, the control circuit feeds scanning signals to the excitation selecting circuit and scanning circuit. As a result, one of the two excitation lines and one sense line are selected. One of the excitation lines thus selected is connected to the excitation signal generating circuit to generate the AC magnetic field, whereas the sense line is connected to the signal processing circuit.

The coordinate indicator is placed on or above the sense line so that its position may be indicated. If this coordinate indicator is placed in the vicinity of two sense lines selected as above, a signal is induced in the selected sense line by electromagnetic coupling between the excitation line and the sense line via the indicator coil.

The control circuit selects the two excitation lines alternatingly by an appropriate method, and selects the sense lines sequentially. Since the sense line generates the induced signal according to the position of the coordinate indicator, the induction signals for the individual sense lines are sequentially inputted to the signal processing circuit. This signal processing circuit generates an envelope waveform according to the amplitudes of those induction signals. The control circuit determines the coordinate values by inputting the amplitudes of the induced signals for the individual sense lines from the envelope waveform and by comparing the amplitudes arithmetically.

According to a second embodiment for reading two-dimensional coordinate values, the loop lines, the excitation scanning circuit and the detection scanning circuit of the first-described embodiment are provided for each of the X- and Y-directions of an orthogonal X-Y coordinate system, and the control circuit is constructed to perform coordinate reading for each of the X- and Y-directions.

BRIEF DESCRIPTION OF THE DRAWING

FIGS. 4(a) and (b) are signal diagrams illustrating the induced signal produced during operation of the system of FIG. 1.

FIGS. 6(a) to 6(c) are diagrams showing the distributions of induced signals relative to coil position.

DESCRIPTION OF THE PREFERRED EMBODIMENTS

A first embodiment of the present invention will be described in the following with reference to FIGS. 1 to 7. This structure is directed to a coordinate reading system for reading one-dimensional coordinate values.

Although not explicitly shown, the coordinate reading system is roughly divided into a coordinate reading plate called the "tablet" and a coordinate indicator. This coordinate indicator can be freely moved on the tablet and used to indicate the position, the coordinate values of which are to be read out.

Figure 1:
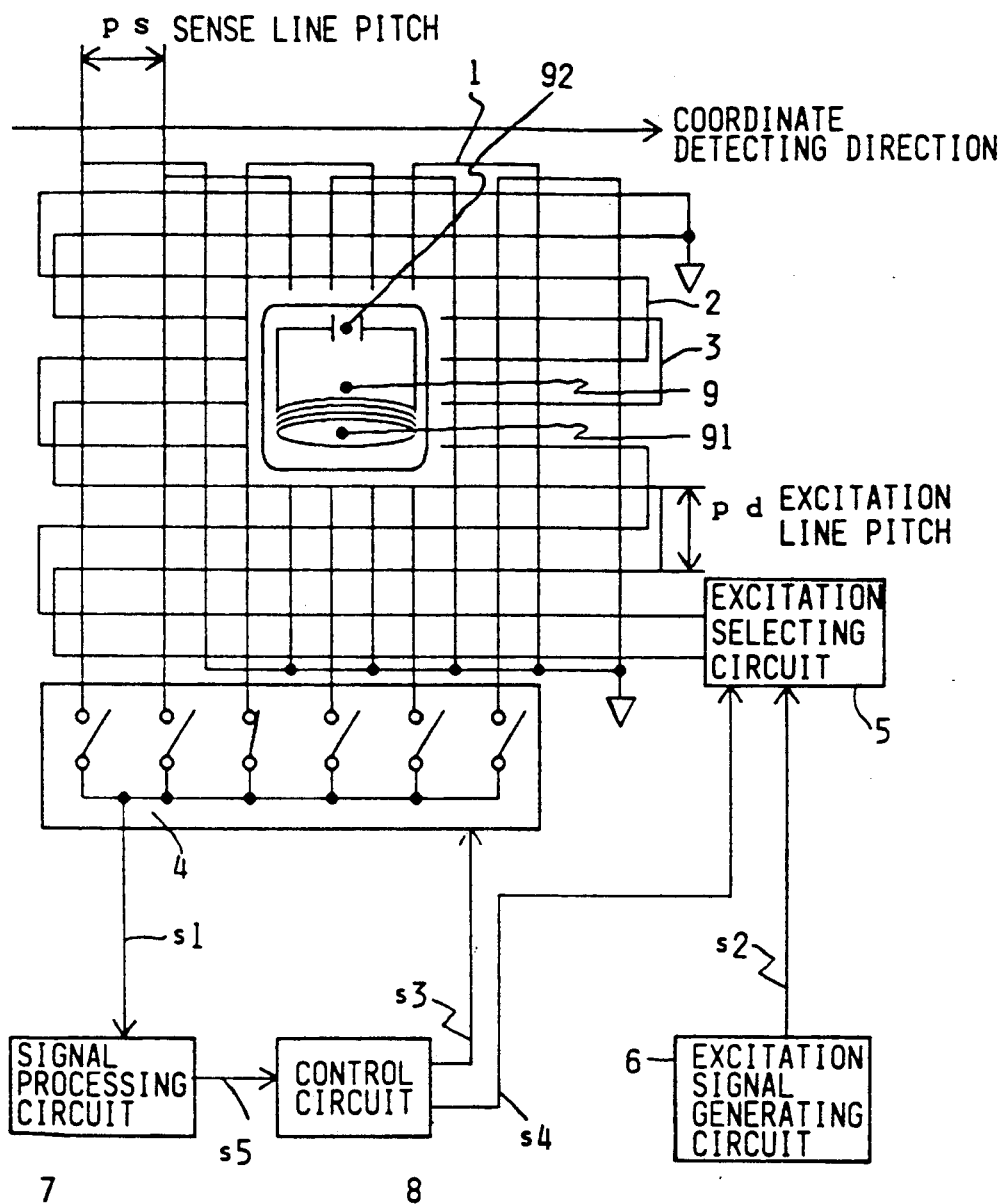
FIG. 1 is a circuit diagram showing the structure of a first embodiment of a coordinate reading system according to the present invention.
Figure 2:
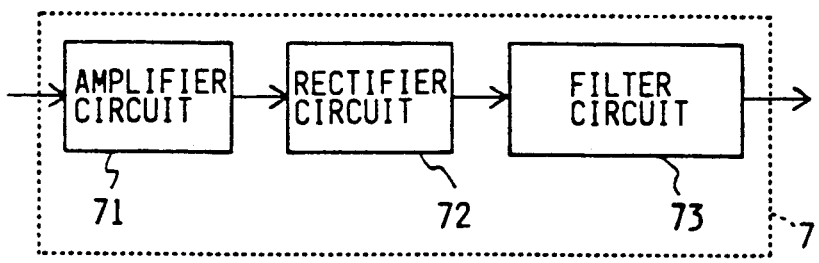
FIG. 2 is a circuit diagram showing the structure of a signal processing circuit employed in the system of FIG. 1.

First of all, the structure will be described in the following. FIGS. 1 and 2 are diagrams showing the structure of the coordinate reading system according to the present invention.

As shown, reference numeral 1 designates sense lines. In the illustrated embodiment, a sense line is composed of two parallel conductors connected together in series and forming a loop. The individual sense lines are laid in the tablet at equal spacings from, and in parallel with, one another. The spacing between adjacent sense lines is the sense line pitch ps. All of the individual sense lines have one end connected to a common point which is grounded. The other ends are individually connected to respective inputs of a scanning circuit 4.

Numeral 2 designates a first excitation line, and numeral 3 designates a second excitation line. These excitation lines are also laid on the tablet and each line is composed of a series arrangement of individual conductors laid in a zigzag, or serpentine, pattern. The conductors of each excitation line 2,3 are laid with an equal mutual spacing from, and in parallel with, one another and extend perpendicular to the coordinate detecting direction and to the main portions of the sense lines. If the distance between conductors of each excitation line 2,3 is designated by an excitation line pitch pd, respective conductors of the first and second excitation lines are spaced apart by a distance of pd/2.

The two excitation lines 2,3 each have one end connected to ground and their other ends connected individually to excitation selecting circuit 5.

The scanning circuit 4 and the excitation selecting circuit 5 are composed of a plurality of electronic switch elements such as analog switches, and the switches of each of these circuits have one end individually connected to an input terminal of circuit 4 and its other end connected to a common terminal, as shown for circuit 4. In response to a selection signal, one of the switch elements is closed to connect its one end to the common terminal.

The scanning circuit 4 has its one ends connected with the individual sense lines of the aforementioned sense line groups 1. Moreover, the common terminal of the scanning circuit 4 is connected to the input of a signal processing circuit 7.

The structure of one suitable embodiment the signal processing circuit 7 is shown in FIG. 2. This signal processing circuit 7 is composed of an amplifier circuit 71, a rectifier circuit 72 and a filter circuit 73. The signal processing circuit 5 functionally generates a signal (s5 in FIG. 1) constituting the envelope of the input signals and could have a structure different from that shown in FIG. 2. It is conceivable to change the arrangement of the amplifier circuit or to provide a plurality of amplifier circuits by considering the S/N ratios, for example, but the structure is essentially identical to that of FIG. 2.

The excitation selecting circuit 5 has its common terminal connected with an excitation signal generating circuit 6. This circuit 6 feeds an excitation signal s2, or an AC signal, to the excitation line which is selected by the excitation selecting circuit 5. The excitation signal s2 is an AC signal of, for example, about 614.4 KHz. However, this signal should not have its frequency restricted to that value but may basically generate an electromagnetic induction between the excitation lines and the sense lines with the aid of coil to be described below.

A control circuit 8 is connected with the scanning circuit 4 and the excitation selecting circuit 5 so as to feed them with selection signals. The selection signal to be fed to the scanning circuit 4 is the "sense address s3", and the selection signal to be fed to the excitation selecting circuit 5 is called the "drive address s4". The control circuit 8 outputs the sense address s3 and the drive address s4. Under control of addresses s4 and s5, one sense line is connected to signal processing circuit 7 and one excitation line is connected excitation signal generating circuit 6 during a given time interval.

The control circuit 8 is further fed with the envelope signal s5 from the signal processing circuit 7. Circuit 8 includes an input unit in the form of an A/D converter for converting the voltage value of the envelope signal s5 into a digital quantity.

A coordinate indicator 9 is composed of a coil 91 and a capacitor 92 to constitute a parallel resonant circuit having a resonant frequency substantially equal to that of the excitation signal s2 which is generated by the excitation signal generating circuit 6.

Next, the operation of the circuit shown in FIGS. 1 and 2 will be described.

The control circuit 8 supplies the excitation selecting circuit 5 with the drive address s4 and connects one of the excitation lines 2,3 to the excitation signal generating circuit 6. After this, the control circuit 8 supplies the scanning circuit 4 with the sense address s3 to connect one of the sense line loops 1 to the signal processing circuit 7.

Here, when the coordinate indicator 9 comes close to the selected sense line, the signal induced in the selected sense line will be affected in the manner to now be described with reference to FIG. 3. The magnitude of the induced signal is a function of the location of the coil in the coordinate detecting direction and of the location at right angles thereto.

Figure 3A:
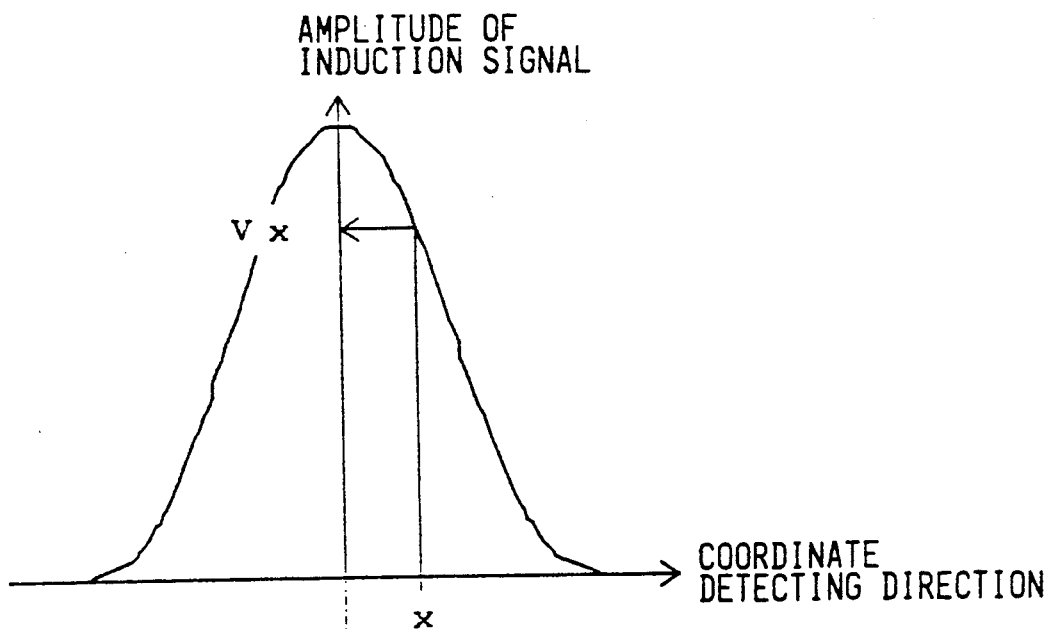
FIGS. 3(a) and (b) illustrate the distribution of an induced signal during operation of the system of FIG. 1.

FIG. 3(a) shows the amplitude of signal which is induced in the sense line corresponding to the position of the coil 91 when the coil 91 moves along the coordinate detecting direction.

Figure 3B:
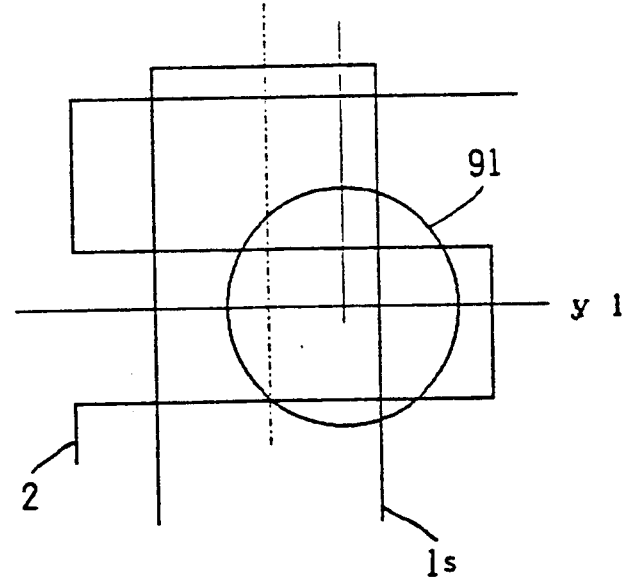
Figure 5:
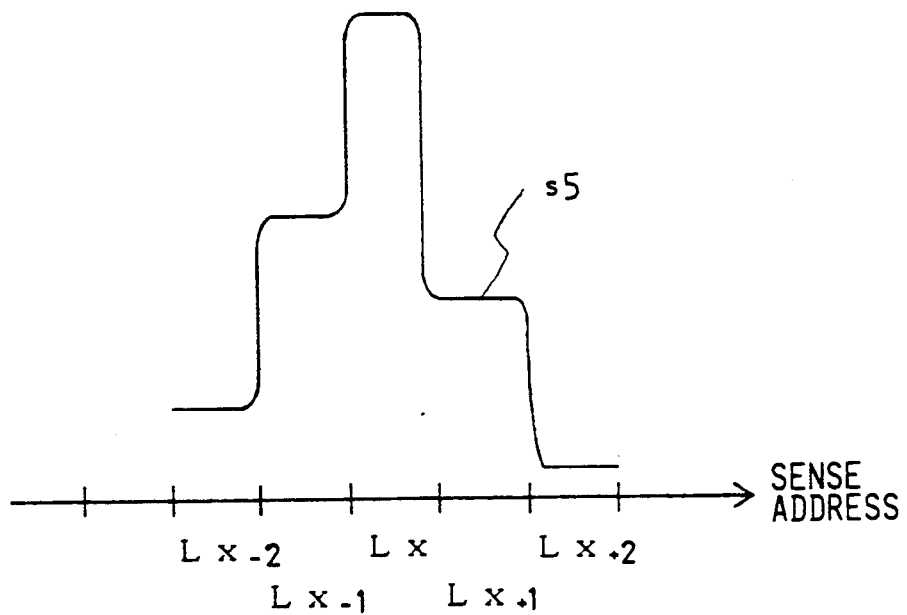
FIG. 5 is a signal diagram showing the form of an envelope line signal produced in the system of FIG. 1.

First of all, the following description is directed to the case in which the coil 91 is between two adjacent parallel conductors of the first excitation line 2 selected, i.e., coil 91 is centered on a coordinate line y1 in FIG. 3(b). Now, let the case be considered, in which the coil 91 is placed in the vicinity of the selected sense line. The first excitation line 2 is connected with the excitation signal generating circuit 6 by the excitation selecting circuit 5 to generate an AC magnetic field. The coil 91 generates an induction signal by electromagnetic coupling with the first excitation line 2, and a signal is induced in the selected sense line 1s by electromagnetic coupling with the coil 91.

As the coil 91 moves away from the selected sense line 1s, the signal induced on the sense line 1s has its amplitude reduced. FIGS. 3(a) and (b) illustrate that the induced signal takes an amplitude Vx when the coil 91 is in a position x. The induced signal will have its maximum amplitude when the center of coil 91 is midway between the two parallel conductors of line 1s.

In case the coil 91 is centered on a conductor of the selected first excitation line 2, it does not induce a signal in sense line 1s because coil 91 is divided into two equal areas by that conductor so that the induction is canceled by the magnetic fluxes passing through the two coil areas and having opposite phases. As a result, no signal is induced in the sense line.

In the coordinate reading system according to the present invention, two excitation lines, i.e., the first and second excitation lines 2 and 3 are provided and are selected alternatingly by the excitation selecting circuit 5 so that an induction signal is generated regardless of the Y-coordinate location of coil 91.

Thus, a signal is induced in a sense line by selecting the excitation line and the sense line. The amplitude of this induced signal contains information concerning the location of coil 91. This information is utilized to determine the location, or position, of indicator 9 by the present coordinate reading system.

The control circuit 8 selects the excitation lines alternatingly and selects all sense lines sequentially while each excitation line is selected. Usually, the control circuit 6 selects the sense lines sequentially one by one in the coordinate detecting direction or in the opposite direction. However, this selecting sequence is not of particular significance. The sequence need not be orderly but may be arbitrary. The following description assumes the adoption of an orderly selecting sequence in the coordinate detecting direction.

In each selecting operation phase, one excitation line and one sense line are selected. Since the selected sense line generates an induced signal depending upon the positional relation to the coil 91, as has been described hereinbefore, the induced signals s1 from successive sense lines are sequentially inputted to the signal processing circuit 7 by selecting the sense lines sequentially.

The induced signals s1 to be inputted to the signal processing circuit 7 are illustrated in FIGS. 4(a) and (b), FIG. 4(b) simply being to a larger scale than FIG. 4(a). In this example, it is indicated that the coil 91 is present in the vicinity of the sense line at the sense address Lx. The signal induced in the sense line is higher when the second excitation line 3 is excited than when the first excitation line 2 is excited. This is because of the assumed positional relation between the coil 91 and the two excitation lines.

The induced signal s1 is amplified and detected and is converted into an envelope signal by the signal processing circuit 7. As has been described hereinbefore, the signal processing circuit 7 is a conventional AM detecting circuit. The induced signal s1, as shown in FIGS. 4, is converted into the envelope signal s5 shown in FIG. 5.

The method of calculating the coordinates from the envelope signal s5 derived from the induced signal s1 can be implemented in the manner employed in coordinate reading systems of the prior art, such as the method disclosed in Japanese Patent Laid-Open No. 96411/1980, as will be briefly described in the following.

The control circuit 8 receives the envelope signal s5 from the signal processing circuit 7 each time the sense line groups 1 are sequentially selected. The input circuit of the control circuit 8 is the A/D converter, as has been described hereinbefore, and the magnitude of the envelope signal s5 is inputted in terms of a digital quantity.

The control circuit 8 detects the maximum value of the envelope signal s5, which is obtained from the sense line which is in closest proximity to coil 91, and the envelope signal values derived from the two sense lines which are adjacent, and are at opposite sides of, the sense line associated with the maximum value. The individual signals are coded in the following manner.

$V_p$—the maximum signal called the "peak signal";

$V_{ph}$—the signal on the sense line which is adjacent in the coordinate detecting direction to the sense line having generated the maximum signal; and $V_{pl}$—the signal on the sense line which is adjacent, in the direction opposite to the coordinate detecting direction, to the sense line having generated the maximum signal.

As to the sense line having generated the maximum signal, its detected address is also stored and called the "peak address", designated hereinafter as Padrs. Padrs roughly indicates the position at which the coordinate indicator is placed. This makes it possible to detect the position in units of the sense line pitch. A finer position resolution can be achieved by a calculation based on the values of the peak signal Vp and its two adjacent signals Vph and Vpl.

For this determination, the following value Q is calculated:

$$Q = (Vp - Vph)/(Vp - Vpl) \quad (1)$$

This value Q has the following properties.

Let it be considered that the coil is placed at a point a, i.e, at the center of the sense line Lj, as shown in FIG. 6(a)I. Here, Li, Lj and Lk designate sense addresses. At this time, the maximum induced signal value is generated during the scanning on the detection sense line Lj, and, as shown in FIG. 6(a)II, the peak signal Vp is inputted to the control circuit 8. The peak address takes Padrs=Lj. For the sense line selection made one time interval earlier, the sense line Li is selected. In this case, a signal Vpl lower than Vp is induced in the loop line Li, and the signal Vpl is inputted to the control circuit 8. For the sense line selection made one time interval later than selection of line Lk, line Lk is selected, and the signal Vph is inputted to the control circuit 8.

In the case of the selections made one time interval before and one time interval after, the effects of the electromagnetic couplings are equal. i.e., Vph=Vpl, although a detailed explanation will be omitted. As a result. Q=1 is obtained from Equation (1).

If the coil moves in the coordinate detecting direction to a point b, as shown in FIG. 6(b)I, the couplings with Li and Lj are reduced during the course of the scanning sequence, but the coupling with Lk is increased. As a result, as shown in FIG. 6(b)II, the signals Vp and Vpl are reduced whereas the signal Vph is increased, so that Q of Equation (1) takes a value smaller than 1.

When the coil moves further to the position c shown in FIG. 6(c)I, i.e., one half of the sense line pitch ps from the position of FIG. 6(a)I, Q takes on its minimum value. At this time, the effects of the couplings with Lj and Lk are equalized so that Vp=Vph, as shown in FIG. 6(c)II, and Q=0.

In case of leftward movement of the coil from position a of FIG. 6(a)I, Q is calculated from Equation (1) by exchanging the signals Vph and Vpl. The changing tendency of the value Q is also identical in this case.

The value of Q is between 1 and 0 for each one half pitch of the sense line and corresponds one-to-one to the precise position between the sense lines. If the characteristics of the value Q are experimentally determined in advance, the precise position between the sense lines can be determined by determining the value Q from the induced signal. The coordinate value is determined by adding and subtracting the rough position at the peak address and the detailed position determined herein.

The following Equations (2) determine the coordinates:

$$\text{Coordinate Value} = Padrs \times ps + f(Q) \quad (2);$$

wherein
Vph>Vpl, or
Coordinate Value=Padrs×ps−f(Q);
wherein Vph<Vpl,
Padrs is the peak address,
ps is the sense line pitch, and
f(Q) is the precise position between the sense lines corresponding to the value Q.

Figure 7:
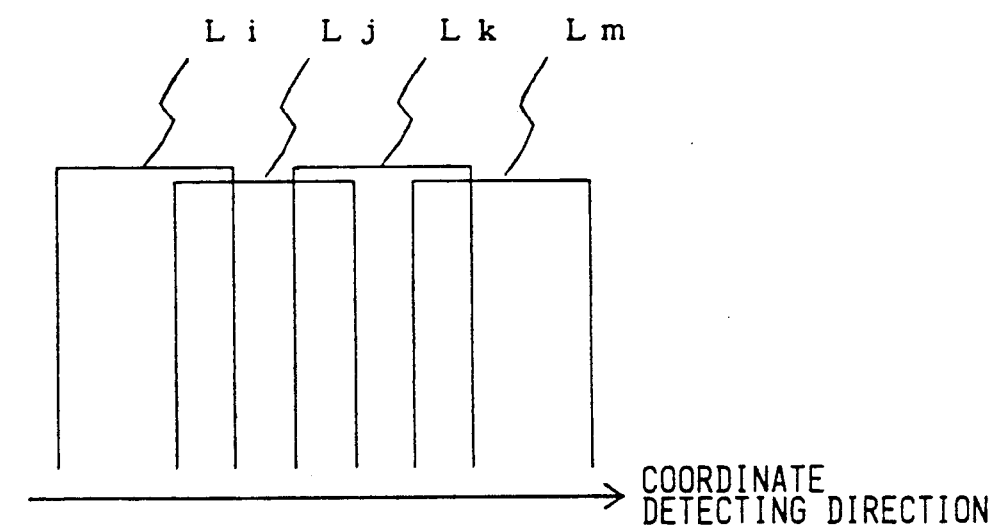
FIGS. 7(a) and (b) are diagrams showing the form of a value Q relative to coil position.
Figure 7B:
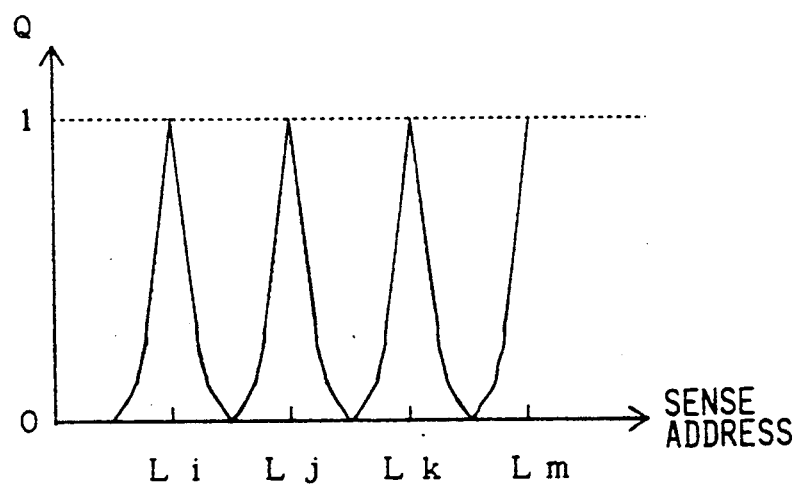
Figure 8:
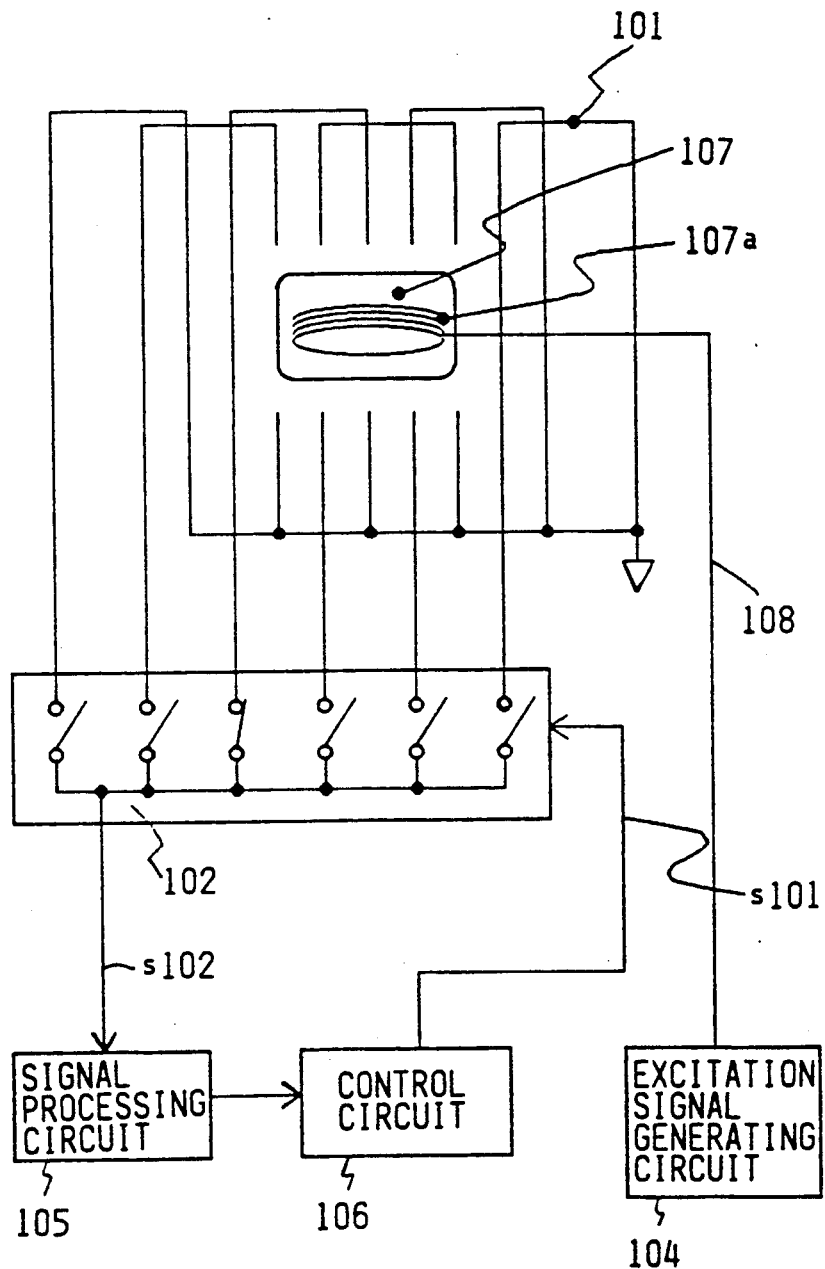
FIG. 8 is a circuit diagram showing the structure of a coordinate reading system according to the prior art.

FIG. 7(a) shows the spatial arrangement of four sense line Li, Lj, Lk and Lm, while FIG. 7(b) shows the manner in which Q varies as the coil is displaced past those sense lines in the coordinate detecting direction.

In the above-described embodiment, the maximum signal during the scanning is adopted as the signal Vp. In more detail, the maximum signals Vp1 and Vp2 for the individual two excitation lines are detected, when the sense line is selected for each of the two excitation lines, so that the larger one of the two is adopted. As another example of the processing, the coordinate values can be likewise determined if the signals Vp, Vpl and Vph are defined, as follows:

Vp1: the maximum signal when the first excitation line is selected;
Vph1: the signal on the sense line which is adjacent in the coordinate detecting direction to the sense line having generated the maximum signal when the first excitation line is selected;
Vpl1: the signal on the sense line which is adjacent, in the direction opposite to the coordinate detecting direction, to the sense line having generated the maximum signal when the first excitation line is selected;
Vp2: the maximum signal when the second excitation line is selected;
Vph2: the signal on the sense line which is adjacent in the coordinate detecting direction to the sense line having generated the maximum signal when the second excitation line is selected; and
Vpl2: the signal on the sense line which is adjacent, in the direction opposite to the coordinate detecting direction, to the sense line having generated the maximum signal when the second excitation line is selected, $$Vp = Vp1 + Vp2;$$

$$Vph = Vph1 + Vph2; \quad (3)$$

$$Vpl = Vpl1 + Vp2.$$

Equation (3) implies the signals Vp, Vph and Vpl are determined in the one-dimensional form of the signals detected during selection of the individual excitation lines, and may be an averaging calculation or the like.

In the description of the first embodiment, the scanning follows the procedure in which all sense lines are selected during selection of each excitation line. The selecting procedures of the excitation lines and the sense lines may be such that two excitation lines are sequentially selected during selection of each sense line. Although, in this case, the sequence of the induced signal s1 to be inputted to the signal processing circuit 7 changes, the control circuit 8 outputs the sense address s3 and the drive address s4 by itself so that the correspondence of the values of the inducted signal s1 to the associated sense line is achieved without any trouble. The sequence of selecting the excitation lines and the sense lines is not an essential aspect of the present invention.

If two sets of: sense line groups, first and second excitation lines, excitation selecting circuits and scanning circuits are provided and constructed, each set being as has been described in connection with the first embodiment, so that they the sense lines and excitation lines of one set are arranged at right angles to the respective lines of the other set, it is apparent that a two-dimensional X-Y coordinate reading system can be constructed. Although not shown, the X sense line group, the first X excitation line, the second X excitation line, the X scanning circuit, and the X excitation selecting circuit; and the Y sense line group, the first Y excitation line, the second Y excitation line, the Y scanning circuit and the Y excitation selecting circuit are provided and constructed exactly as in the above-described embodiment in the X and Y directions and are arranged at right angles to one another, although the operation of this second embodiment will not be described. For this second embodiment, it is only necessary to provide circuits 7, 8 and 9 with the capability to select the two sets of lines and to properly direct induced signals to appropriate channels in circuit 8. Coordinate detection can be achieved by performing X-coordinate reading in alternation with Y-coordinate reading.

As has been described hereinbefore, according to the present invention, two sets of zigzag excitation lines are provided and are excited in alternation to determine the position of the coil from the induced signals coming from the electromagnetic couplings between the excitation line and the coil and between the coil and the sense line. Since no signal is fed to the coil packaged in the coordinate indicator, unlike the coordinate reading systems of the prior art, it is possible to realize a wireless coordinate reading system in which the coordinate indicator need not be connected to the tablet through the signal lines.

This application relates to subject matter disclosed in Japanese application JP 2-125052 filed on May 15, 1990, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced within.

I claim:

1. A wireless coordinate reading system comprising:
   a. a plurality of sense lines disposed in parallel with one another and equispaced from one another in a coordinate detecting direction;
   b. a first excitation line composed of a plurality of conductors connected together in series and arranged in a zigzag pattern, said conductors being disposed in parallel with one another and equispaced from one another and extending in a direction to intersect said sense lines at right angles to said sense lines;
   c. a second excitation line composed of a plurality of conductors connected together in series and arranged in a zigzag pattern, said conductors being disposed in parallel with one another and equispaced from one another and extending in a direction to intersect said sense lines at right angles to said sense lines, with each conductor of said second excitation line being positioned between two adjacent conductors of said first excitation line;
   d. an excitation signal generating circuit for producing an AC signal;
   e. an excitation selecting circuit connected for selecting one of said first excitation line and said second excitation line to connect the selected excitation line to said excitation signal generating circuit;
   f. a scanning circuit connected for selecting one of said sense lines;
   g. a coordinate indicator containing means including a coil and forming a resonator constructed to resonate with the AC signal generated by said excitation signal generating circuit, said indicator being positionable relative to said sense lines and said excitation lines in order for said resonator to electromagnetically couple said first and second excitation lines and said sense lines;
   h. a signal processing circuit connected to said scanning circuit for processing signals induced in said sense lines by electromagnetic coupling with said coil contained in said coordinate indicator; and
   i. a control circuit connected to said excitation selecting circuit, said scanning circuit and said signal processing circuit for determining a coordinate of the position of said coordinate indicator by controlling said excitation selecting circuit and said scanning circuit such that one of said first excitation line and said second excitation line is selected by said excitation selecting circuit and said sense lines are sequentially selected by said scanning circuit, and by receiving, from said signal processing circuit, induced signals which are induced on the individual sense lines selected by said scanning circuit and processing the amplitudes of said induced signals arithmetically.

2. A system as defined in claim 1 wherein said coordinate indicator is a self-contained device which is free of any physical connection to any of said sense lines or any of said circuits.

3. A wireless coordinate reading system comprising:
   a. a plurality of X-coordinate sense lines disposed in parallel with one another and equispaced from one another in an X-coordinate detecting direction, and a plurality of Y-coordinate sense lines disposed in parallel with one another and equispaced from one another in an X-coordinate detecting direction, said X-coordinate sense lines being oriented at right angles to said Y-coordinate sense lines to define an X-Y orthogonal coordinate plane;
   b. a first X-coordinate excitation line composed of a plurality of conductors connected together in series and arranged in a zigzag pattern, said conductors being disposed in parallel with one another and equispaced from one another and extending in a direction to intersect said X-coordinate sense lines at right angles to said X-coordinate sense lines, a first Y-coordinate excitation line composed of a plurality of conductors connected together in series and arranged in a zigzag pattern, said conductors being disposed in parallel with one another and equispaced from one another and extending in a direction to intersect said Y-coordinate sense lines at right angles to said Y-coordinate sense lines;
   c. a second X-coordinate excitation line composed of a plurality of conductors connected together in series and arranged in a zigzag pattern, said conductors being disposed in parallel with one another and equispaced from one another and extending in a direction to intersect said X-coordinate sense lines at right angles to said X-coordinate sense lines, with each conductor of said second X-coordinate excitation line being positioned between two adjacent conductors of said first X-coordinate excitation line, and a second Y-coordinate excitation line composed of a plurality of conductors connected together in series and arranged in a zigzag pattern, said conductors being disposed in parallel with one another and equispaced from one another and extending in a direction to intersect said Y-coordinate sense lines at right angles to said Y-coordinate sense lines, with each conductor of said second Y-coordinate excitation line being positioned between two adjacent conductors of said first Y-coordinate excitation line;

d. an excitation signal generating circuit for producing an AC signal;

e. an X-coordinate excitation selecting circuit connected for selecting one of said first X-coordinate excitation line and said second X-coordinate excitation line to connect the selected Y-coordinate excitation line to said excitation signal generating circuit, and a Y-coordinate excitation selecting circuit connected for selecting one of said first Y-coordinate excitation line and said second Y-coordinate excitation line to connect the selected Y-coordinate excitation line to said excitation signal generating circuit;

f. an X-coordinate scanning circuit connected for selecting one of said X-coordinate sense lines, and a Y-coordinate scanning circuit connected for selecting one of said Y-coordinate sense lines;

g. a coordinate indicator containing means including a coil and forming a resonator constructed to resonate with the AC signal generated by said excitation signal generating circuit, said indicator being positionable relative to said sense lines and said excitation lines in order for said resonator to electromagnetically couple said first and second X-coordinate excitation lines and said X-coordinate sense lines and to electromagnetically couple said first and second Y-coordinate excitation liens and said Y-coordinate sense lines;

h. a signal processing circuit connected with said X-coordinate scanning circuit and said Y-coordinate scanning circuit for processing signals induced in said sense lines by electromagnetic coupling with said coil contained in said coordinate indicator; and i. a control circuit connected to said excitation selecting circuits, said scanning circuits and said signal processing circuits for determining the X coordinate and Y coordinate of the position in which said coordinate indicator is placed, by controlling said excitation selecting circuits and said scanning circuits such that one of said first excitation line and said second excitation line for each coordinate is selected by said excitation selecting circuit and said sense lines for each coordinate are selected in a given sequence by said scanning circuits, and by receiving, from said signal processing circuit, induced signals which are induced on the individual sense lines selected by said scanning circuits and processing the amplitudes of said induced signals arithmetically.

4. A system as defined in claim 3 wherein said control circuit is operative for causing said X-coordinate excitation selecting circuit to select one of said first and second X-coordinate excitation lines and said X-coordinate scanning circuit to sequentially select said X-coordinate sensing lines, and for causing said Y-coordinate excitation selecting circuits to select one of said first and second Y-coordinate excitation lines and said Y-coordinate scanning circuit to sequentially select said Y-coordinate sensing lines.

5. A system as defined in claim 3 wherein said coordinate indicator is a self-contained device which is free of any physical connection to any of said sense lines or any of said circuits.

* * * * *